Oct. 12, 1926.
O. C. RITZWOLLER
WINDSHIELD CLEANER
Filed Sept. 30, 1921
1,602,457
2 Sheets-Sheet 1
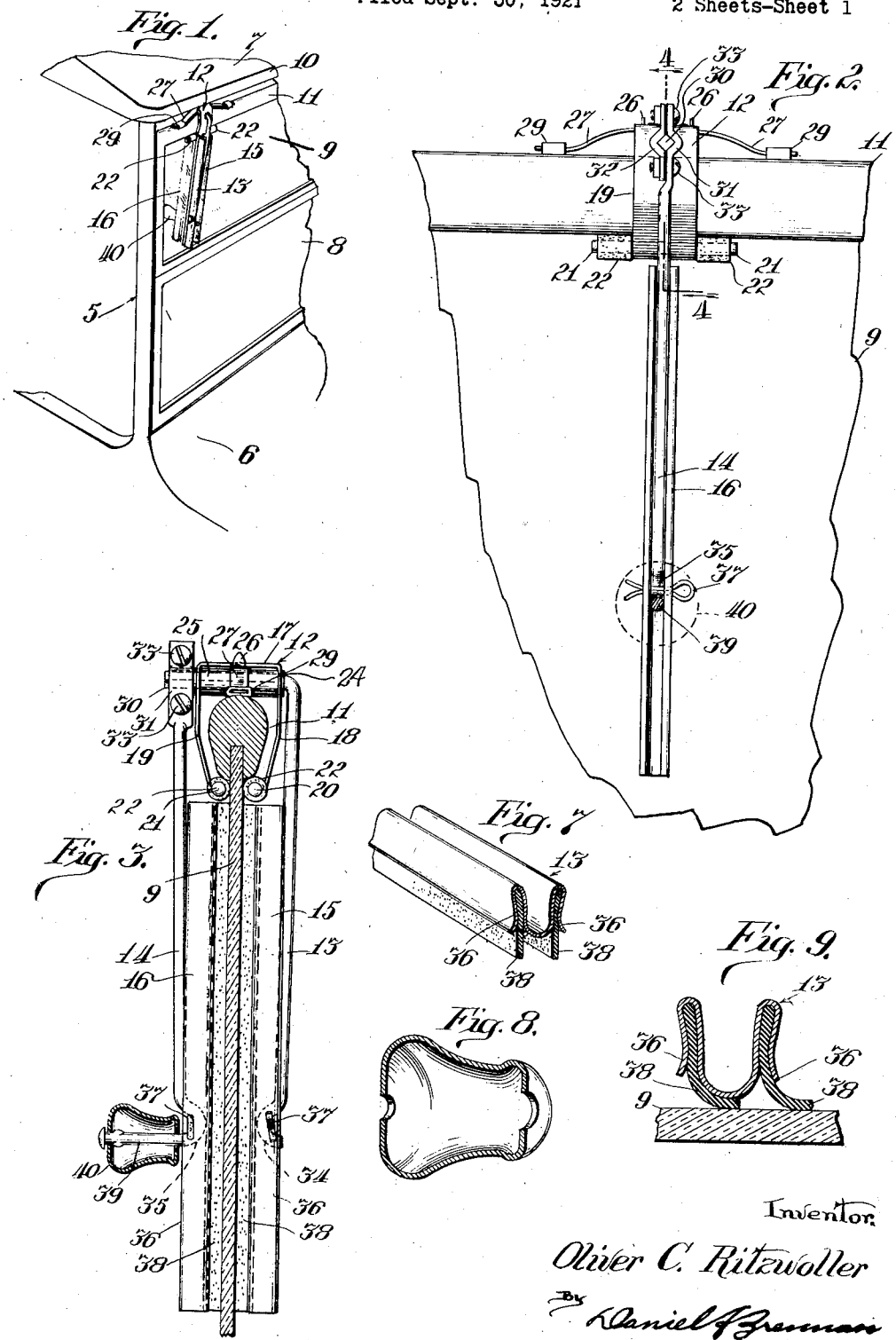

Oct. 12, 1926.  
O. C. RITZWOLLER  
WINDSHIELD CLEANER  
Filed Sept. 30, 1921  
1,602,457  
2 Sheets-Sheet 2
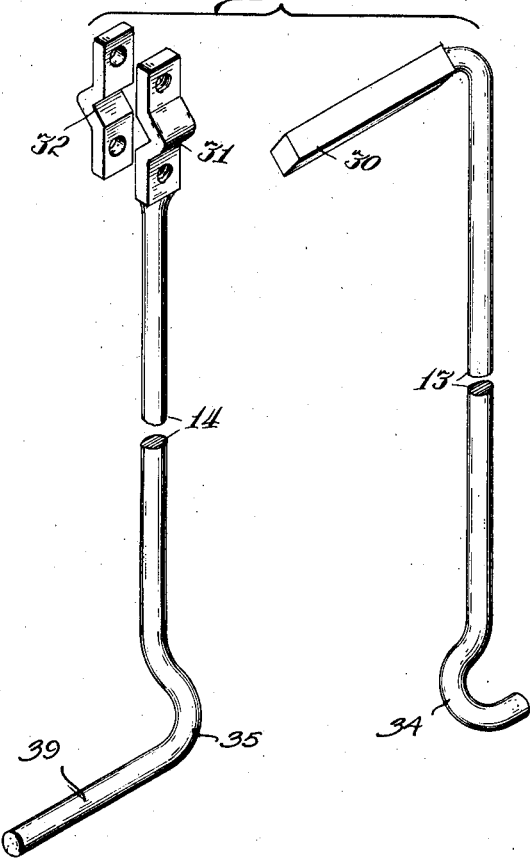
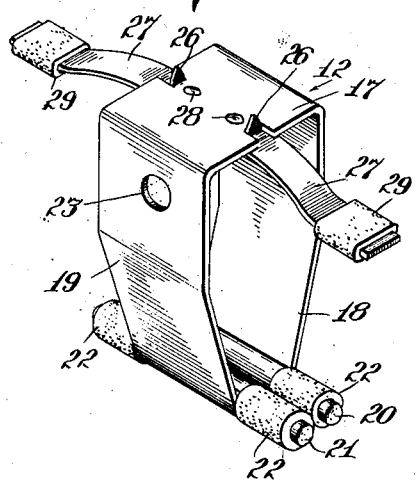
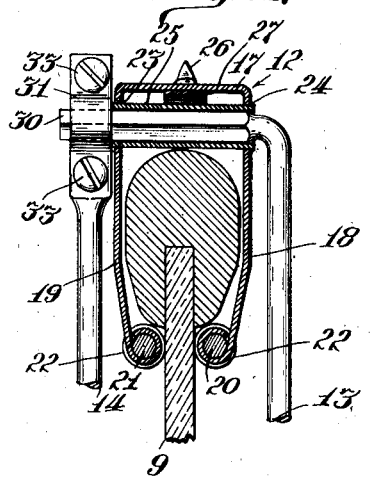
Inventor  
Oliver C. Ritzwoller  
By Daniel J Brennan.  
Attorney Patented Oct. 12, 1926.

1,602,457

UNITED STATES PATENT OFFICE.

OLIVER C. RITZWOLLER, OF CHICAGO, ILLINOIS.

WINDSHIELD CLEANER.

Application filed September 30, 1921. Serial No. 504,299.

This invention relates to wind shield cleaners, and has for its principal aim the provision of a novel and improved unit cleaner construction embodying a clamp for engagement with the upper edge of the wind shield frame and carrying spaced pivoted wipers lying on either side of the glass pane for removing snow and rain from the outer surface of the shield, and for erasing the mist or other condensation which may gather on the inner surface of the shield.

Another and no less important aim of the invention is to provide a novel arrangement of the cleaning devices or wipers; and to provide a clamp which may readily be installed on the frame without the use of tools, and without danger of marring either the frame or the glass; the clamp is as well provided with means for engaging the top of the vehicle, so as to prevent longitudinal movement or shifting of the cleaner on the frame.

A further aim of the invention resides in the wiper construction, this being such that when the wipers are moved across the pane their surfaces are widened, so as to more effectively clean the surface of the pane of glass, and to prevent any metal from coming in contact with the glass.

Among the other aims of this invention are the resilient or yielding nature of the clamp whereby the same is caused to fixedly engage the vehicle top; the contractile nature of the arms carrying the wipers, and the mounting of the wipers; and the general flexibility and usefulness of the device, coupled with its extreme simplicity and compactness which insure the possibility of manufacture at low cost.

Other aims and advantages, together with a more concrete understanding of this invention, will appear from the following detail description and the claims, taken with an inspection of the accompanying drawings, in which:

Figure 1 is a fragmentary perspective view of an automobile top and wind shield, showing the preferred embodiment of this invention installed.

Figure 2 is a rear elevation of the device in operative position showing a portion of the wind shield.

Figure 3 is a vertical sectional view through the wind shield, showing the invention in side elevation.

Figure 4 is a vertical sectional view taken on line 4—4 of Fig. 2, looking in the direction indicated by the arrows.

Figure 5 is a perspective view of the clamp.

Figure 6 embodies fragmentary perspective views of the cleaner arms disassembled.

Figure 7 is a fragmentary perspective view of one of the squeegees or wipers.

Figure 8 is a similar view of an operating handle.

Figure 9 is an enlarged sectional view showing the squeegees when compressed in course of wiping.

Referring to the drawings, including all the figures, 5 is a standard wind shield frame mounted on the cowl 6 of a motor vehicle, such as an automobile, 7 being the vehicle top, and 8 and 9 the lower and upper sections of the wind shield. It will be observed that, as is customary, the forward edge 10 of the vehicle top overlies the upper rail 11 of the upper wind shield section 9. This latter section may or may not be horizontally hinged for swinging movement.

The device of my invention, in its preferred, and probably most popular construction, broadly embodies a clamp 12 for engagement over the upper rail 11 of the wind shield; which clamp carries the pivoted spaced resilient arms 13 and 14, which lie to the front and rear of the section 9, and carry squeegees 15 and 16, respectively, in contact with the respective adjacent surfaces of the glass pane of the wind shield section 9.

As best shown in Figs. 2 to 5, inclusive, the body of the clamp is formed of a single plate of resilient metal, bent to provide a top portion 17 and spaced convergent jaws 18 and 19 embracing the rail 11. The ends of these jaws lie below the lower edges of the rigid rods 20 and 21, the free ends of which latter project and carry each on these projecting ends, sleeves 22—22 of rubber or some other suitable material for preventing marring of the rail 11 or pane of glass 9.

It will be observed from Figures 4 and 5, that the jaws have each relatively parallel portions, and in order to properly journal the arms 13 and 14, these portions of the jaws, near the top portion 17, are provided with complementally alined openings 23, in which latter are rotatably or otherwise disposed the free ends of a cylindrical sleeve 25. In order to prevent longitudinal movement or shifting of the clamp on the rail 11, the free edges of the top portion 17 are struck upwardly to afford upstanding sharp tines 26—26, which are adapted to engage in the fabric of the overlying edge 10 of the vehicle top. These tines are thus retained when the clamp is in position, by means of a pair of oppositely disposed longitudinal spring tongues 27—27, formed preferably of a single arcuate resilient strip of metal, riveted or otherwise secured at its medial portion to the under surface of the clamp top portion 17, as shown at 28. Obviously these tongues might as readily and without exercise of inventive skill be formed integrally with the clamp. The free ends of the tongues are provided with rubber coverings 29—29 to prevent marring of the upper rail 11.

The cleaning or wiping devices are carried by the arms 13 and 14, which arms, as will be observed in Fig. 3, are somewhat contracted toward the adjacent surfaces of the glass pane. The arm 13, at its upper end is bent at 30 and squared, this squared part lying in the sleeve 25 and being rotatably mounted therein. The free end of the squared portion 30 projects to receive the arm 14, which latter is flattened at its upper end and angularly formed and perforated to afford a clamping jaw 31, a similarly formed clamping jaw 32 being removably secured thereto by suitable bolts 33, passing through the openings in the jaws. These jaws completely embrace the squared end 30 of the arm 13, and thus the squared portion 30 affords a common pivot bearing for both of said arms 13 and 14.

For connection of the wipers 15 and 16 to the arms 13 and 14, the free lower ends of the latter are provided with inwardly curved portions 34 and 35, respectively, which portions lie between the parallel channels 36—36 composing the metallic frames of the squeegees or wipers, suitable complemental openings being provided in the frames of the wipers to receive cotter pins 37—37, which latter when inserted lie outside of the offset or curved portion 34 and 35. Each of the channels 36—36 of each wiper or squeegee 15 and 16 carries a flexible wiping blade 38 of soft rubber or other suitable material, and when the arms are swung about their common pivot the blades 38—38 will flex and thus present a relatively large wiping surface to the glass, as will appear in Fig. 9. This is caused by the combined contractile action of the arms 13 and 14, and the natural flexibility of the blades.

The front arm 13 is terminated at its curved portion 34, but the rear arm 14 is laterally rearwardly extended to provide a shank 39 for receiving a hollow handle knob 40, the free end of the shank 39 being swaged or headed for retaining said knob.

The manner of installation, operation and advantages of this invention are obvious, the parts being constructed of stock materials easily obtained and stamped up and assembled. It will be observed that in actual use no metal can come in contact with either the glass or any polished surfaces of the wind shield frame. Furthermore, the device when not in use may be readily swung up out of the view of the driver, the blades of the squeegees serving to frictionally engage the wind shield and hold the device out of the way.

I claim:

1. The combination with a wind shield and a vehicle top, of a cleaner for the shield comprising a clamp detachably secured to the upper edge of the wind shield, cleaning arms pivoted on said clamp and disposed on either side of the shield, and anchor means on said clamp fixedly engaging the vehicle top.

2. The combination with a wind shield and a vehicle top, of a cleaner for the shield comprising a clamp detachably secured to the upper edge of the wind shield, cleaning arms pivoted on said clamp and disposed on either side of the shield, and projections on the clamp fixedly engaging the vehicle top, for preventing sliding of the clamp.

3. The combination with a wind shield and a vehicle top, of a cleaner for the shield comprising a clamp detachably secured to the upper edge of the wind shield, yieldable cleaning arms disposed on either side of the shield and pivoted to said clamp, and a plurality of tines struck up from the clamp for engagement with the vehicle top.

4. In a wind shield cleaner, a clamp having spaced resilient jaws, a pair of spaced resilient arms pivoted in said jaws and having offset portions, a pair of squeegees comprising each a metallic strip formed to provide a plurality of spaced channels for receiving the respective ends of said arms, pins extending through said channels and engaging in front of the offset portions in said arms to form pivotal connections, and relatively large flexible wiping blades in said channels.

5. In a wind shield cleaner, in combination, a clamp adapted to engage the edge of the frame of a wind shield, a pair of spaced substantially parallel arms pivoted in said clamp and adapted to lie on opposite sides of the glass pane of the wind shield, said arms having their free ends bent to form curved elbows, a squeegee carried by each arm, each squeegee being formed complemental to and both provided with channels to receive said elbows, and pins extending transversely of said channels and in front of said elbows for pivotally connecting said arms to said squeegees, one of said arms being extended beyond the elbow for receiving an operating handle.

6. In a wind shield cleaner, a clamp having spaced resilient jaws, a pair of spaced resilient arms pivoted in said jaws, a pair of squeegees carried by said arms, said squeegees each comprising metal strips bent to form parallel spaced troughs or channels, and a flexible wiping blade in each of said channels.

7. The combination with a wind shield and a vehicle top having one end disposed above said shield, of a cleaning device comprising a clamp having spaced resilient jaws embracing the frame of the wind shield, a pair of squeegees pivotally mounted in said clamp and disposed on either side of the shield, a plurality of tines on said clamp for engagement with the under side of said vehicle top, and a pair of spring tongues on said clamp for engagement with the wind shield frame for forcing said tines into engagement with the top.

8. The combination with a wind shield and a vehicle top having one end disposed above said shield, of a cleaning device comprising a clamp having spaced resilient jaws embracing the frame of the wind shield, a pair of squeegees pivotally mounted in said clamp and disposed on either side of the shield, a plurality of tines on said clamp for engagement with the under side of said vehicle top, means on said clamp for forcing said tines into said top, and means carried by the clamp for engagement underneath the top portion of the frame of said wind shield.

In testimony whereof, I affix my signature at 36 W. Randolph St., Chicago, Illinois.

OLIVER C. RITZWOLLER.